March 1, 1927. 1,619,499
L. E. CURTIS
CONTINUOUS LATH EXPANDING MACHINE
Filed May 22, 1924 5 Sheets-Sheet 2

Inventor.
Lewis E. Curtis,
By Dyrenforth, Lee, Chritton & Wiles
Attys.

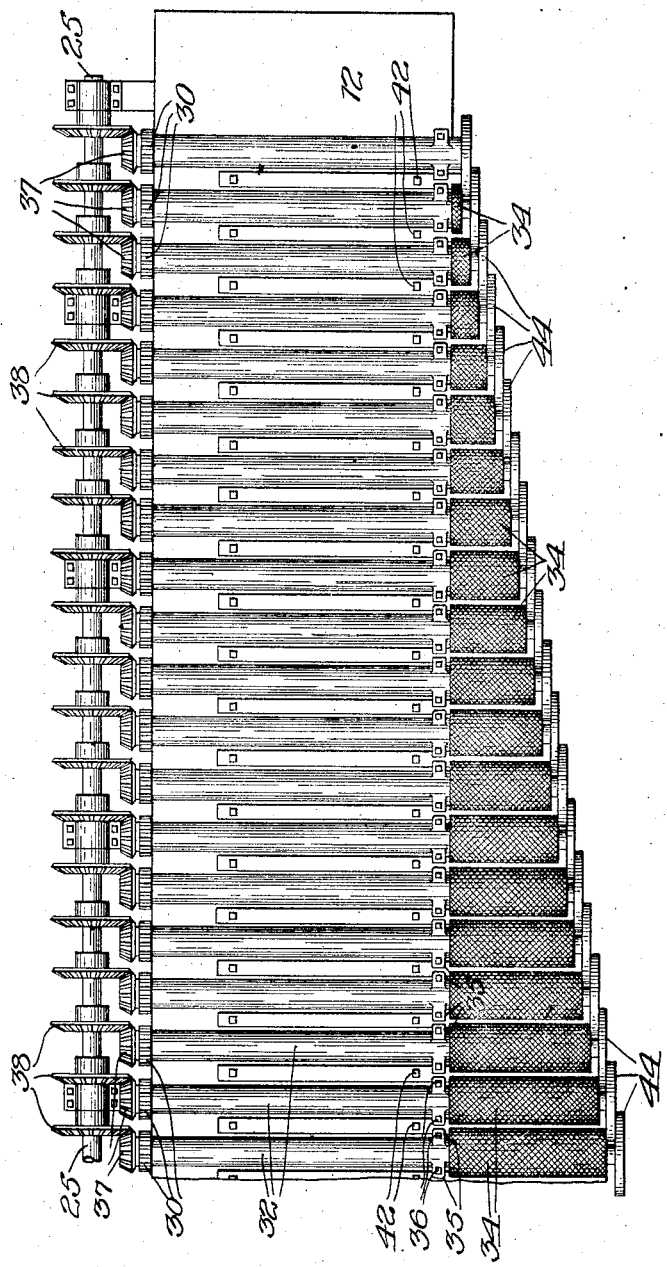

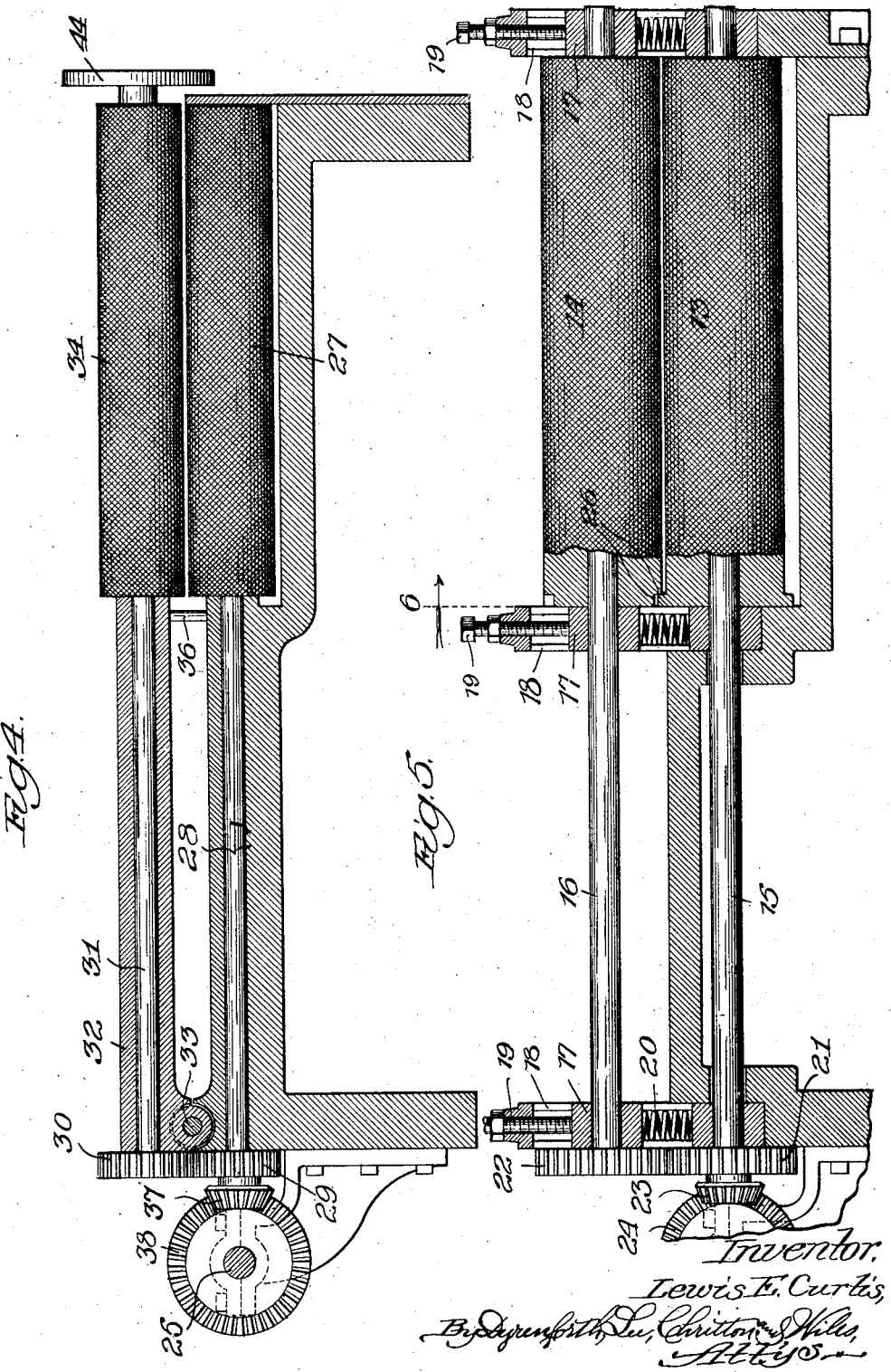

March 1, 1927. 1,619,499
L. E. CURTIS
CONTINUOUS LATH EXPANDING MACHINE
Filed May 22, 1924 5 Sheets-Sheet 5
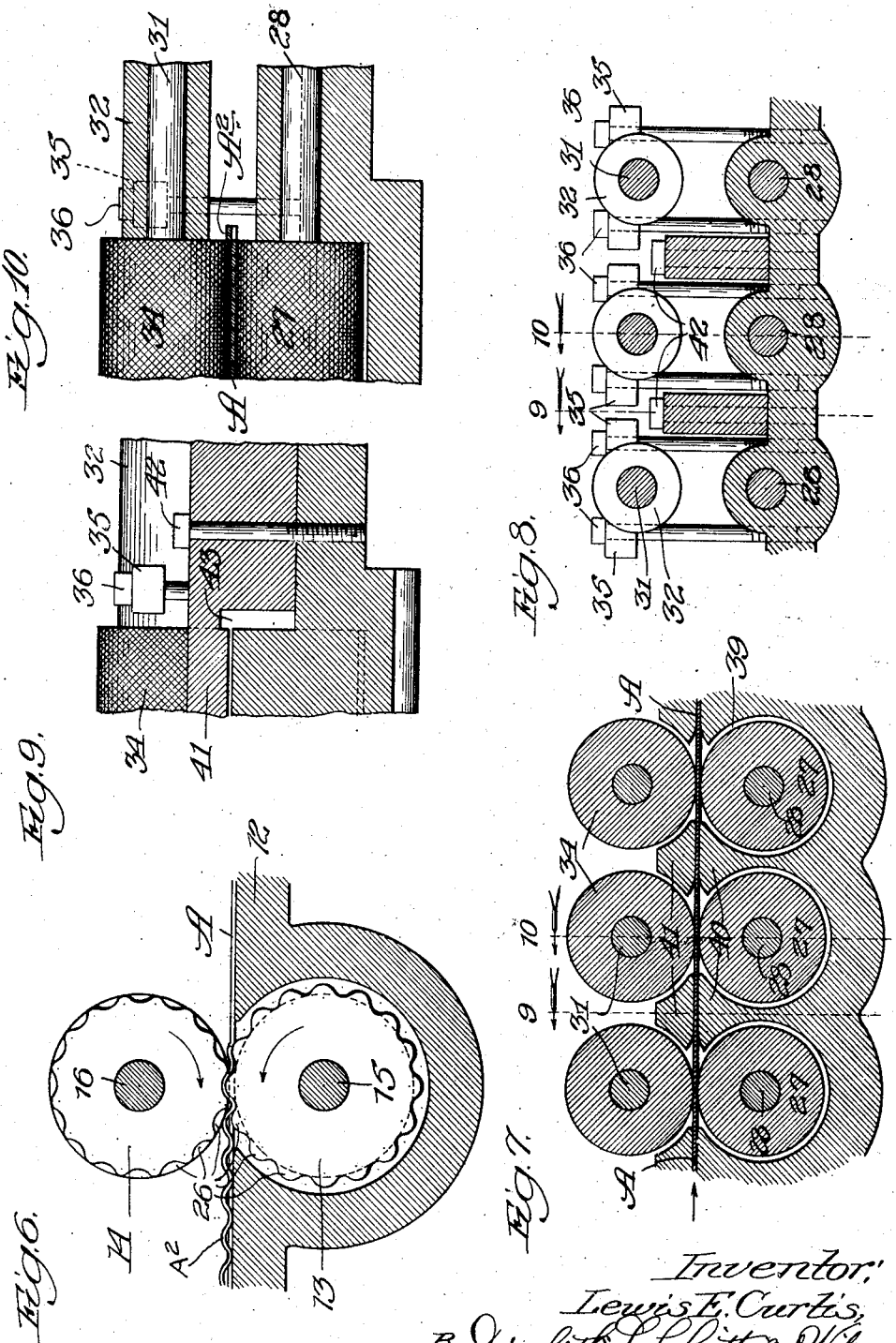

Patented Mar. 1, 1927.

1,619,499

UNITED STATES PATENT OFFICE.

LEWIS E. CURTIS, OF MILWAUKEE, WISCONSIN, ASSIGNOR TO THE YOUNGSTOWN PRESSED STEEL COMPANY, A CORPORATION OF OHIO.

CONTINUOUS LATH-EXPANDING MACHINE.

Application filed May 22, 1924. Serial No. 715,137.

This invention relates to improvements in machines for expanding metal, and will be fully understood from the following specification and shown in the accompanying drawings in which:

Fig. 3 is a similar view of the forward end of the machine;

Fig. 4 is an enlarged transverse section on the line 4 of Fig. 2;

Fig. 5 is a similar section on this line 5 of Fig. 2;

Fig. 6 is an enlarged section on the line 6 of Fig. 5 showing the corrugating rolls;

Figure 2:
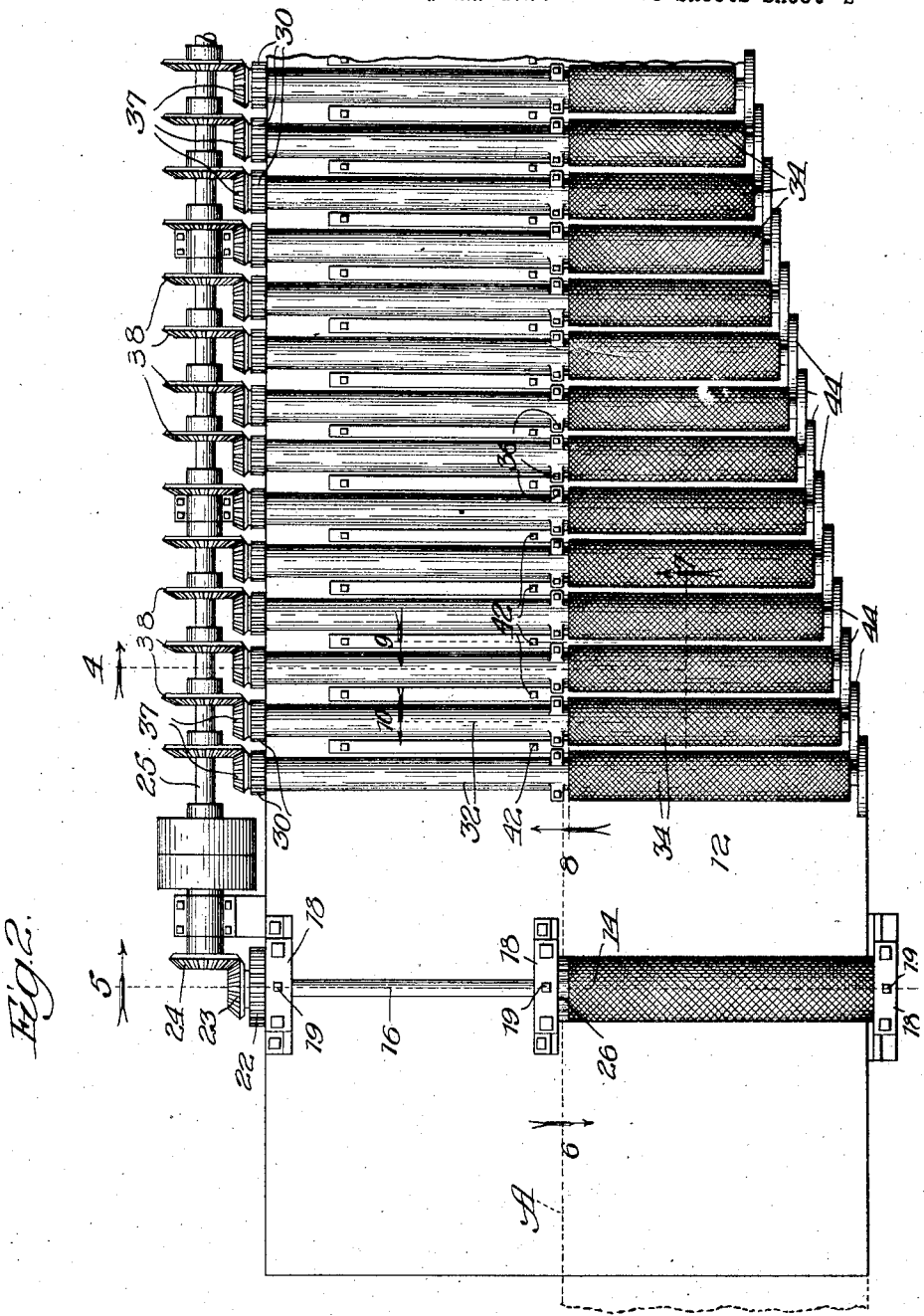
Fig. 2 is an enlarged plan view of the rear end of the machine.

Figs. 7 and 8 are longitudinal sections on the lines 7 and 8 of Fig. 2; and

Figs. 9 and 10 are partial transverse sections on the lines 9 and 10 of Fig. 2.

Figure 1:
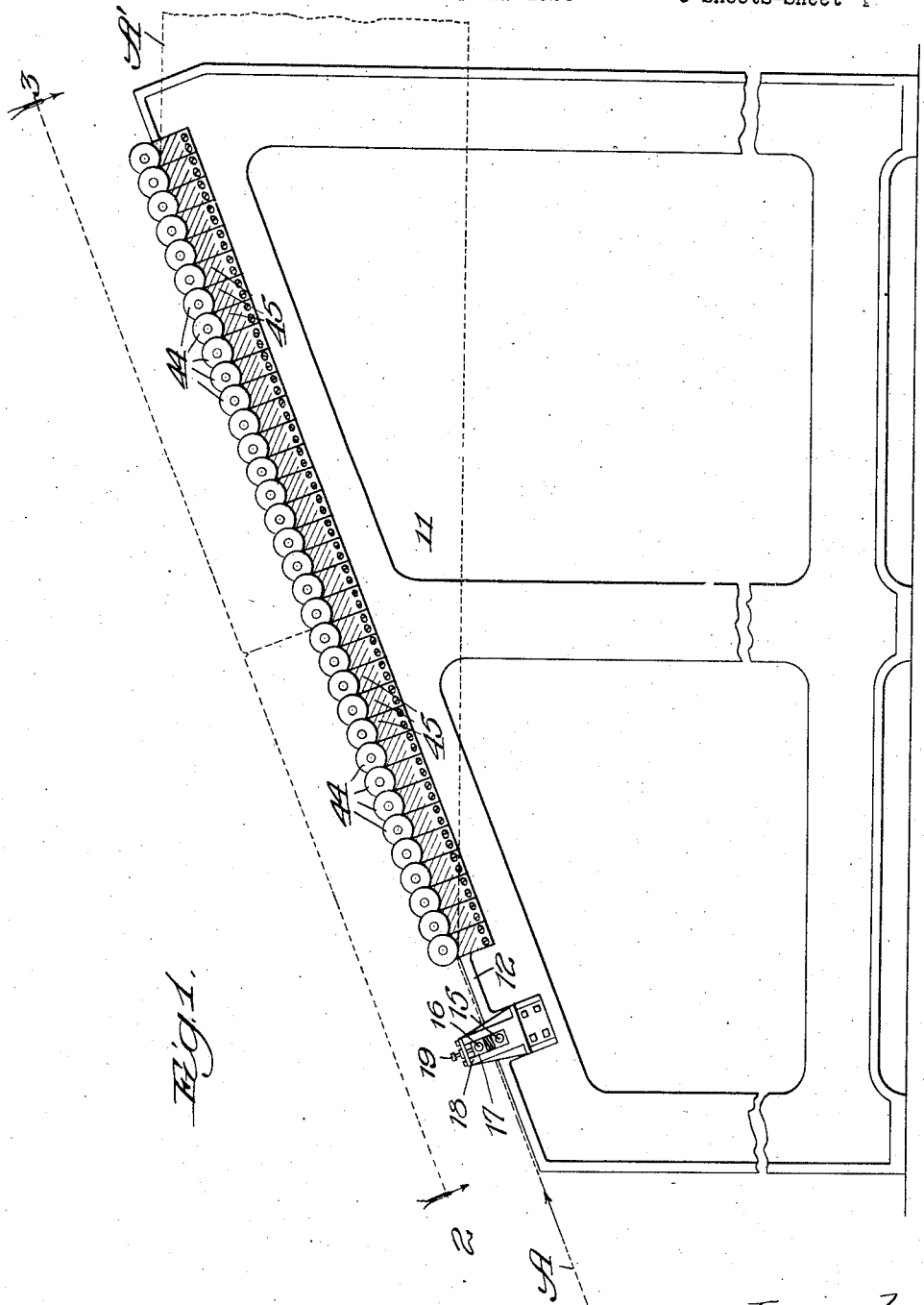
Figure 1 is a side elevation of the machine.

The embodiment illustrated comprises a main frame 11 having a bed or way 12 which is preferably inclined as shown in Fig. 1 and which is cut away in a series of diagonally disposed steps as shown in Figs. 2 and 3. The longitudinally slitted blank A passes up along this bed or way as shown in Figs. 1 and 2 and in passing over the stepped diagonal edge is expanded, emerging at the side as A'.

Overlying the lower end of the bed or way is a pair of feed rollers 13 and 14 secured upon shafts 15 and 16, the lower being suitably journalled within the bed or way, the top of the lower roller being substantially in line with the upper surface thereof. The upper shaft 16 is journalled in bearings 17 which are slidably mounted in guides 18 and which are adjustable therein by means of screws 19. Springs 20 placed between the bearings 17 and the bearings on the lower shaft normally tend to separate these bearings and to hold the upper bearings in contact with the screws 19. Meshing gears 21 and 22 are keyed on the shafts 15 and 16 and cause these shafts to turn in opposite directions. A bevel gear 23 on the shaft 15 meshes with a bevel gear 24 on the drive shaft 25, the latter being driven by any suitable source of power, not shown.

At their inner ends the feed rollers 13 and 14 are provided with complementary corrugating or crimping rolls 26 as shown in Figs. 5 and 6 so that as the slitted sheet A advances its inner edge will be partly cut and raised as indicated at $A^2$, Fig. 6, thus forming a serrated edge which prevents lateral movement of the slitted blank as it travels along the bed or way, as will later be explained.

In the bed or way is a series of feed rolls 27 which are keyed on shafts 28, the latter being journalled in the bed or way and having gears 29 keyed thereon, meshing with gears 30 on shafts 31 which are journalled in bearings 32. These bearings are pivotally connected at 33 with the main frame. Upper feed rolls 34 overlie the lower rolls 27 and are preferably of the same length as the rolls which they overlie, as shown in Fig. 4. These rolls, as will be seen from Figs. 2 and 3, are of varying length, the length diminishing uniformly toward the upper end of the bed or way.

The inner ends of the rolls 27 and 34 are in alignment, the upper roll forming a rolling abutment against which the serrated edge $A^2$ of the slitted blank bears as it advances, as shown in Fig. 10, thus forcing the blank to travel in a straight line along the bed or way.

The bearings 32 are provided with ears 35, as shown in Fig. 8, through which pass adjusting screws 37, whereby the distance between the rolls 27 and 34 may be adjusted. The shafts 31 are driven by means of beveled gears 30 meshing with beveled gears 29 on the shaft 28.

The lower feed rolls 27 lie in cylindrical openings 39, the top of these rolls being substantially in alignment with the top of the separating segments 40 on the bed or way, as shown in Fig. 7. Between the upper feed rolls 34 is a series of guides 41 which are secured to the main frame by means of screws 42, as shown in Fig. 10. These guides are notched at 43 to permit the serrated edges $A^2$ of the blank to pass. On the outer end of each upper feed roll 34 is mounted a disk 44 which is larger than the feed roll, so that as the slitted blank advances it will be forced down by these rollers over the diagonally disposed dies 45, thereby deflecting the strands and expanding the slitted sheet which leaves the machine at A' in a fully expanded condition.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a machine for expanding slitted sheet metal having a deformed edge, a bed for supporting the slitted blank, a series of stepped ledges arranged diagonally of the bed, means lying in the path of said blank to deflect it over the stepped ledges, said means acting as a guide for the deformed edge of the sheet, and rolls for moving said blank along the bed.

2. In a machine for expanding slitted sheet metal having a deformed edge, a bed for supporting the slitted blank, a series of stepped ledges arranged diagonally of the bed, rollers lying in the path of said blank to deflect it over the stepped ledges, said rollers acting as a guide for the deformed edge of the sheet, and means for moving said blank along the bed.

3. In a machine for expanding slitted sheet metal having a deformed edge, a bed for supporting the slitted blank, a series of stepped ledges arranged diagonally of the bed, and feed rolls carried by said bed having rollers for deflecting the blank over said ledges, said feed rolls serving as means for guiding said deformed edge along the bed.

4. In a machine for expanding slitted sheet metal blanks, a table for supporting the slitted blank, a plurality of expander units arranged diagonally of the table, the said units including lower feed rolls journalled in the table, upper feed rolls co-operating with the lower feed rolls, means for corrugating the inner edge of the blank, and means on the inner ends of said rolls for engaging said corrugations to guide said blank.

5. In a machine for expanding slitted sheet metal blanks, a table for supporting the slitted blank, a plurality of expander units arranged diagonally of the table, upper feed rolls co-operating with the lower feed rolls, means for corrugating the inner edge of the blank, and means for engaging said corrugations to guide said blank.

6. In a machine for expanding slitted sheet metal having a deformed edge, a bed for supporting the slitted blank, said bed having an edge extending diagonally thereof, means lying in the path of said blank to deflect it over said edge, and means associated with said bed for moving the blank therealong including guiding means for the deformed edge of the sheet.

In witness whereof I have hereunto set my hand this 13th day of May, 1924.

LEWIS E. CURTIS.